US011057316B2

(12) United States Patent
Leung et al.

(10) Patent No.: US 11,057,316 B2
(45) Date of Patent: *Jul. 6, 2021

(54) LITE NETWORK SWITCH ARCHITECTURE

(71) Applicant: Facebook, Inc., Menlo Park, CA (US)

(72) Inventors: Che Kin Leung, Fremont, CA (US);
Xu Wang, Fremont, CA (US); Zhiping Yao, Santa Clara, CA (US);
Hans-Juergen Schmidtke, Mountain View, CA (US); Lingjun Wu, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,052

(22) Filed: Sep. 26, 2019

(65) Prior Publication Data
US 2020/0021539 A1    Jan. 16, 2020

Related U.S. Application Data

(63) Continuation of application No. 15/706,561, filed on Sep. 15, 2017, now Pat. No. 10,476,816.

(51) Int. Cl.
| H04B 10/07 | (2013.01) |
| H04L 12/933 | (2013.01) |
| H04L 12/937 | (2013.01) |
| G06F 13/40 | (2006.01) |
| G06F 13/42 | (2006.01) |
| G06F 1/20 | (2006.01) |

(52) U.S. Cl.
CPC .......... *H04L 49/15* (2013.01); *G06F 13/4022* (2013.01); *G06F 13/4081* (2013.01); *G06F 13/426* (2013.01); *G06F 13/4278* (2013.01); *H04L 49/253* (2013.01); *G06F 1/20* (2013.01); *G06F 2213/0008* (2013.01); *G06F 2213/4004* (2013.01); *H04L 49/1515* (2013.01)

(58) Field of Classification Search
None
See application file for complete search history.

(56) References Cited

U.S. PATENT DOCUMENTS

| 5,629,836 | A | 5/1997 | Wright |
| 5,729,752 | A | 3/1998 | Snider |
| 5,997,326 | A | 12/1999 | Koradia |
| 6,195,703 | B1 | 2/2001 | Blumenau |
| 6,373,713 | B1 | 4/2002 | Jensen |
| 6,381,146 | B1 | 4/2002 | Sevier |
| 6,422,876 | B1 | 7/2002 | Fitzgerald |
| 6,637,846 | B2 | 10/2003 | Yang |

(Continued)

OTHER PUBLICATIONS

Corrected Notice of Allowability dated Nov. 21, 2017 for U.S. Appl. No. 15/291,313 by Schmidtke, H., et al., filed Oct. 12, 2016.

(Continued)

*Primary Examiner* — Brandon M Renner
(74) *Attorney, Agent, or Firm* — Van Pelt, Yi & James LLP

(57) ABSTRACT

Disclosed embodiments include a network switch having a first group of switch elements and a second group of switch elements. The second group of switch elements is cross-connected to the first group of switch elements to passively route network traffic through the network switch in accordance with a predefined configuration.

20 Claims, 9 Drawing Sheets

(56) References Cited

U.S. PATENT DOCUMENTS

| | | | |
|---|---|---|---|
| 6,814,582 B2 | 11/2004 | Vadasz | |
| 6,930,890 B1 * | 8/2005 | Branscomb | G06F 1/14 361/788 |
| 6,950,394 B1 | 9/2005 | Chou | |
| 7,050,307 B2 | 5/2006 | Doblar | |
| 7,092,642 B2 | 8/2006 | Way | |
| 7,240,364 B1 * | 7/2007 | Branscomb | H04L 29/12113 726/5 |
| 7,435,095 B1 | 10/2008 | Yi | |
| 8,154,867 B2 | 4/2012 | Shearman | |
| 9,136,624 B1 | 9/2015 | Reynov | |
| 9,686,886 B2 | 6/2017 | Okada | |
| 2003/0080568 A1 | 5/2003 | Busby | |
| 2003/0215232 A1 | 11/2003 | Jahn | |
| 2004/0002237 A1 | 1/2004 | Doblar | |
| 2004/0047128 A1 | 3/2004 | McClelland | |
| 2004/0097138 A1 * | 5/2004 | Kha | H04Q 1/142 439/668 |
| 2005/0207134 A1 | 9/2005 | Belady | |
| 2006/0049727 A1 | 3/2006 | Corsini | |
| 2006/0121421 A1 | 6/2006 | Spitaels | |
| 2007/0184676 A1 | 8/2007 | Minich | |
| 2008/0320117 A1 * | 12/2008 | Johnsen | H04Q 1/035 709/221 |
| 2011/0013348 A1 | 1/2011 | Seibold | |
| 2012/0120596 A1 | 5/2012 | Bechtolsheim | |
| 2012/0269510 A1 * | 10/2012 | Hui | H04L 27/2697 398/50 |
| 2012/0281575 A1 | 11/2012 | Iwata | |
| 2013/0265067 A1 * | 10/2013 | Leedy | G01R 31/2894 324/750.01 |
| 2013/0337665 A1 | 12/2013 | Cohen | |
| 2014/0098492 A1 | 4/2014 | Lam | |
| 2014/0181354 A1 * | 6/2014 | Yi | G06F 13/4022 710/313 |
| 2014/0206273 A1 | 7/2014 | Larsen | |
| 2014/0255022 A1 | 9/2014 | Zhong | |
| 2014/0307400 A1 | 10/2014 | French, Jr. | |
| 2014/0341037 A1 | 11/2014 | Rácz | |
| 2014/0341225 A1 | 11/2014 | Subramanian et al. | |
| 2014/0362874 A1 | 12/2014 | Nishimoto | |
| 2015/0229438 A1 | 8/2015 | Le Taillandier De Gabory | |
| 2016/0014885 A1 * | 1/2016 | Motamedi | H05K 7/1487 385/14 |
| 2016/0077556 A1 | 3/2016 | Gong | |
| 2016/0128230 A1 | 5/2016 | Lam | |
| 2016/0197679 A1 | 7/2016 | Tanaka | |
| 2016/0357694 A1 * | 12/2016 | Lubivy | G06F 13/36 |
| 2017/0078771 A1 | 3/2017 | Lingampalli | |
| 2017/0245030 A1 | 8/2017 | Lyubomirsky | |
| 2017/0279711 A1 * | 9/2017 | Patel | H04L 45/60 |
| 2017/0329371 A1 | 11/2017 | Schmidtke | |
| 2017/0331766 A1 | 11/2017 | Schmidtke | |
| 2017/0332506 A1 | 11/2017 | Schmidtke | |
| 2017/0332518 A1 | 11/2017 | Schmidtke | |
| 2017/0332519 A1 | 11/2017 | Schmidtke | |
| 2018/0052745 A1 | 2/2018 | Marripudi | |

OTHER PUBLICATIONS

European Perforators Association "The Advantages of Perporated Metals" Aug. 21, 2016, Europerf.

Non-Final Office Action dated Aug. 29, 2017 for U.S. Appl. No. 15/291,293 by Schmidtke, H., et al., filed Oct. 12, 2016.

Non-Final Office Action dated Jun. 15, 2017 for U.S. Appl. No. 15/338,255 by Lyubomirsky, I., et al., filed Oct. 28, 2016.

Non-Final Office Action dated Nov. 17, 2017 for U.S. Appl. No. 15/291,348 by Schmidtke, H. et al., filed Oct. 12, 2016.

Non-Final Office Action dated Nov. 24, 2017 for U.S. Appl. No. 15/291,263 by Schmidtke, H., et al., filed Oct. 12, 2016.

Notice of Allowance dated Dec. 6, 2017 for U.S. Appl. No. 151291,293 by Schmidtke, H., et al., filed Oct. 12, 2016.

Notice of Allowance dated Jul. 3, 2017 of U.S. Appl. No. 15/291,313 of Schmidtke H., et al., filed Oct. 12, 2016.

U.S. Appl. No. 15/291,263 by Schmidtke, H., et al., filed Oct. 12, 2016.

U.S. Appl. No. 15/291,293 by Schmidtke, H., et al., filed Oct. 12, 2016.

U.S. Appl. No. 15/291,313 by Schmidtke, H., et al., filed Oct. 12, 2016.

U.S. Appl. No. 15/291,324 by Schmidtke, H., et al., filed Oct. 12, 2016.

U.S. Appl. No. 15/291,348 by Schmidtke, H., et al., filed Oct. 12, 2016.

U.S. Appl. No. 15/338,255 by Lyubomirsky, I., et al., filed Oct. 28, 2016.

U.S. Appl. No. 15/655,795 by Schmidtke, H. et al. filed Jul. 20, 2017.

U.S. Appl. No. 15/705,205 by Schmidtke, H. et al. filed Sep. 14, 2017.

U.S. Appl. No. 15/716,454 by Schmidtke, K. filed Sep. 26, 2017.

U.S. Appl. No. 15/725,239 by Taylor, J., et al., filed Oct. 4, 2017.

* cited by examiner

LITE NETWORK SWITCH ARCHITECTURE

CROSS REFERENCE TO OTHER APPLICATIONS

This application is a continuation of co-pending U.S. patent application Ser. No. 15/706,561, entitled LITE NETWORK SWITCH ARCHITECTURE filed Sep. 15, 2017 which is incorporated herein by reference for all purposes.

TECHNICAL FIELD

The disclosed teachings relate generally to computer networking devices and, more particularly, to a lite network switch architecture with relatively fewer switch elements in a cross-connect configuration to improve performance and reduce costs.

BACKGROUND OF THE INVENTION

Network switches (also known as switching hubs, bridging hubs, MAC bridges or simply "switches") are computer networking devices that connect other devices together in a computer network. Network switches are typically used in complex data networking environments to, for example, interconnect various devices within one or more sub-networks. Some network switches use packet switching to receive, process, and forward network traffic to destination devices. Switches can be used for electrical switching, optical switching that enables signals in optical fibers or integrated optical circuits to be selectively switched from one circuit to another, or a combination of electrical and optical switching.

Typical network switches include multiple circuit boards with associated switch elements (e.g., line cards and fabric controller cards) that are interconnected via backplane or midplane circuit boards within an enclosure. The line cards typically include a modular electronic circuit designed to fit on a separate printed circuit board (PCB) and interface with a data communications network, and can provide transmitting or receiving ports for a local area network (LAN) and/or a wide area network (WAN). Each line card includes one or more switch elements to transmit or receive network traffic. Fabric controller cards can include one or more switch elements for implementing stages of the switch fabric. The line cards and fabric cards can be mounted to the backplane or midplane in a motherboard/daughterboard relationship in which the backplane or midplane extends transversely across the enclosure of a network switch. It would be advantageous for a network switch to implement a less complex configuration of switch elements that improves performance.

DETAILED DESCRIPTION

Figure 1:
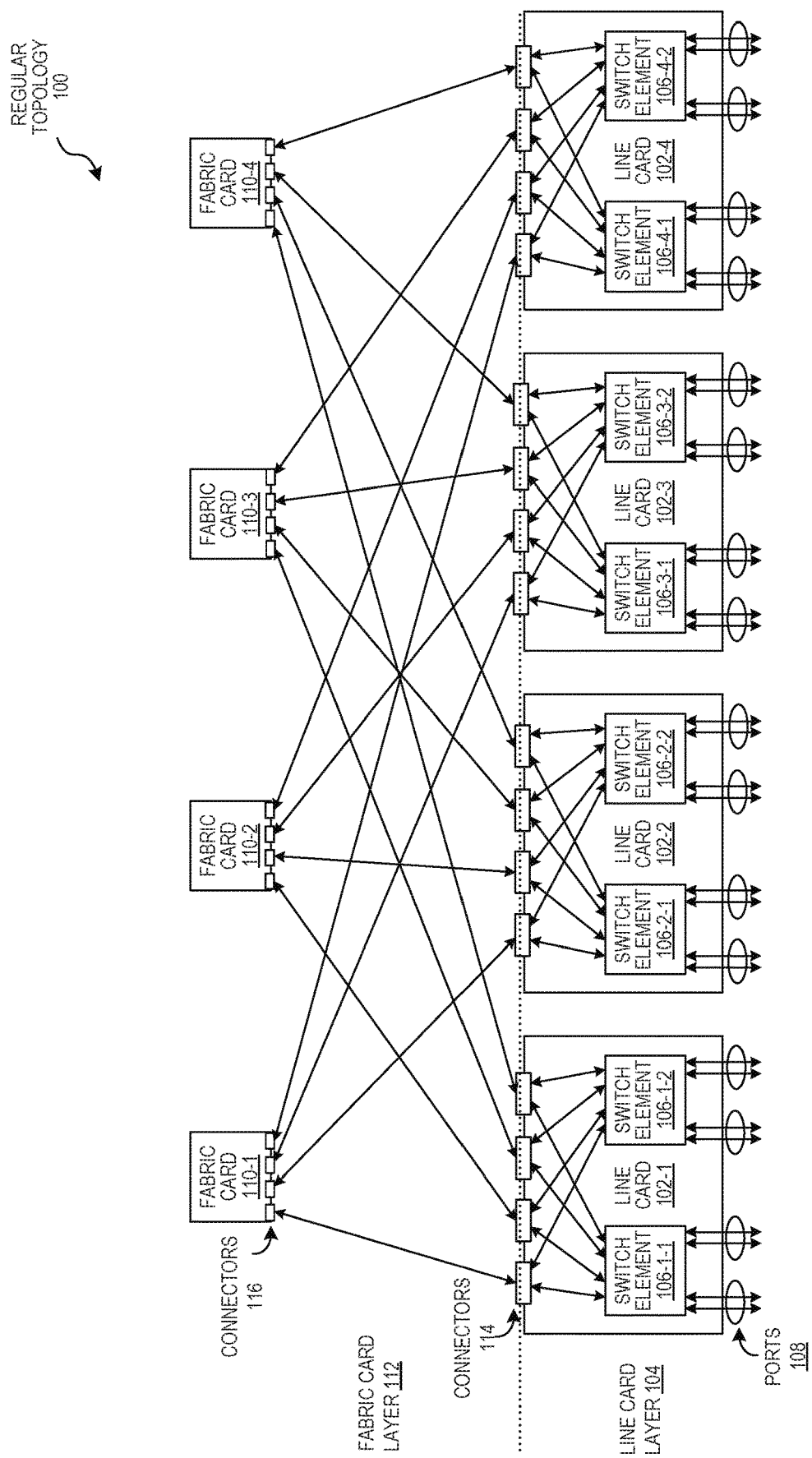
FIG. 1 is a block diagram illustrating a switch element topology of a regular network switch.

The following disclosure describes various embodiments of network switches for use in, for example, highly-functioning data computing environments, such as server data computing environments, data centers, and the like. In some embodiments, a network switch configured in accordance with the present technology has fewer switch elements compared to conventional network switches (also referred to as "regular switch elements") and implements a passive cross-connect topology of fewer switch elements to reduce costs and reduce power consumption while improving performance because fewer hops are required to traverse the network switch. In other words, the passive aspect refers to replacing certain switch elements on the Fabric Cards with passive PCB (CCB), and achieve the power and cost savings. In some embodiments, a network switch configured in accordance with the present technology is referred to as a "lite network switch" because it has fewer switch elements, is less costly, more efficient, and consumes less power compared to regular network switches.

A network switch typically has a number of line cards connected to fabric controller cards ("fabric cards"). The line cards form a line card layer of the network switch, and the fabric cards form a fabric card layer of the network switch. The line cards have ports that can connect to external network devices. All network traffic (e.g., data packets) routed through the network switch traverses a line card layer to a fabric card layer and then to a line card layer. As such, all network traffic routed through a network switch traverses at least three hops.

A regular network switch has a number of switch elements in a generic arrangement to enable communications of network traffic by any ports for any network usage. A regular network switch may have a number of switch elements in each of a number of line cards in a line card layer, and a number of fabric card switch elements in a fabric card layer. The line cards support a number of ports and the entire network switch supports a total number of ports multiplied by the number of line cards. Moreover, the regular network switch is said to enable "non-blocking" communications because data provided to an input port can go to any output port as long as the capacity of the output port is not exceeded. In contrast, "blocking" communications may refer to data provided to an input port that might not be able to be provided to one or more output ports due to the system internal interconnectivity limits.

The disclosed embodiments improve over regular network switch architectures by reducing the number of switch elements required for a particular network usage. A "switch element" is a device that can receive or send data to other device(s) or connector(s). A switch element can be implemented using an application-specific integrated circuit (ASIC). In some embodiments, lite network switches configured in accordance with the present technology can eliminate the need for fabric cards by making certain assumptions about a desired use such that ports are pre-assigned or pre-configured for that desired use. This simplifies the printed circuit boards (PCBs) for a lite network switch considerably. By eliminating the fabric cards, traffic between switch elements can traverse fewer hops, which can improve performance compared to regular network switches that use fabric controller cards. A "hop" may refer to a step from one device to another in a route that traverses a network switch.

By eliminating the fabric cards, some network traffic that traverses the lite network switch need only traverse two hops. In contrast, all network traffic that traverses a regular network switch must traverse at least three hops. In particular, the network traffic would need to traverse a line card layer to a fabric card layer to a line card layer. Thus, embodiments of the disclosed lite network switches can improve network performance and reduce costs compared to regular network switches because the lite network switches have fewer components and network traffic traverses fewer hops. The foregoing are only some of the aspects of the various embodiments of lite network switches and other computer systems described herein, and further details describing these aspects are provided below.

Certain details are set forth in the following description and in FIGS. 1-10 to provide an understanding of various embodiments of the present technology. In other instances, well-known structures, materials, operations and/or systems often associated with network switches, circuit boards, electrical connectors, computer hardware, and associated systems and methods are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying figures depict embodiments of the present technology and are not intended to be limiting of its scope. The sizes of various depicted elements are not necessarily drawn to scale, and these various elements may be arbitrarily enlarged to improve legibility. Component details may be abstracted in the figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced.

FIG. 1 is a block diagram illustrating a topology 100 of switch elements of a regular network switch. The illustrated configuration is commonly called a two-stage spine-and-leaf architecture of Clos topology. The topology 100 can be implemented in a computer system as a switch architecture of a network switch, and is referred to herein as a "regular topology 100" of a regular network switch for ease of reference. In some instances, the regular topology 100 can be implemented in various types of computer systems including switch systems, server systems, etc. A regular network switch implementing the regular topology 100 can be enclosed by a cabinet constructed from, for example, sheet metal panels attached to a metal framework using techniques well known in the art.

In the illustrated example, the regular topology 100 includes a total of twelve switch elements. The regular topology 100 specifically includes four line cards 102-1 through 102-4 (also referred to collectively as line cards 102 and individually as line card 102) in a line card layer 104. Each line card 102 includes a pair of switch elements 106 (also referred to individually as switch element 106-1-1 through 106-4-2 or switch element 106), and each switch element 106 of a line card 102 includes four ports 108 for receiving data from external devices of a computer network and ASICs for forwarding the data. Thus, the regular topology 100 has a total of 32 ports that can receive network traffic and forward the network traffic to other ports or external devices of the computer network.

The line cards 102 of the line card layer 104 are electrically connected to each other via four fabric cards 110-1 through 110-4 (also referred to collectively as fabric cards 110 and individually as fabric card 110) of a fabric card layer 112. Specifically, the fabric cards 110 are switch elements that are directly electrically connected to each line card 102 which are indirectly electrically connected to each other via the fabric cards 110. In the foregoing manner, each of the line cards 102 is in direct electrical communication with each of the fabric cards 110 in the absence of, for example, an intervening circuit board connection, and the line cards 102 are in indirect electrical communication with each other. The direct electrical connections between the line cards 102 and the fabric cards 110 can shorten the signal path and improve the quality of signals exchanged between these components.

In the illustrated example, the number of connectors of the line card layer 104 equal the number of connectors of the fabric card layer 112. Specifically, each of the line cards 102 has four fabric card connectors 114 and each of the fabric cards 110 has four corresponding line card connectors 116. Each of the fabric card connectors 114 of the line cards 102 are directly electrically connected to the corresponding line card connectors 116 of each of the fabric cards 110. The connectors 114 and 116 can form communication links between the line card layer 104 and fabric card layer 112 but do not themselves perform signal processing. Specifically, each fabric card 110-1 through 110-4 has four links, with one link to each line card 102-1 through 102-4. Thus, there are a total of 16 links between the fabric card connectors 114 and the line card connectors 116. Each link stands for 8×100 gigabit ports. At the level below, inside the line card (114 to 106), each link stands for 4×100 gigabit ports. In some instances, there could be more or fewer links between the fabric card layer 112 and the line card layer 104. For example, each line card could have a single connector per switch element that can form links to corresponding connectors of fabric cards. In this example, there would only be eight links between a line card layer and a fabric card layer.

The line cards 102 support a number of ports that can receive and send network traffic. The regular topology 100 enables "non-blocking" communications in that the ports 108 can communicate traffic at the same time without needing to block traffic of other ports 108 as needed. In operation, the ports 108 of the line cards 102 can function to send or receive data as needed by the network. That is, the ports 108 of the line cards 102 can dynamically switch between sending and receiving network traffic in coordination with the fabric cards 110 that operate to route the network traffic to particular ports 108 of line cards 102 as needed by network usage. When receiving network traffic, a port of a switch element is operating as an uplink port (also referred to as an input or receiving port). When sending traffic, a port of a switch element is operating as a downlink port (also referred to as an output or sending port).

Although the direct electrical connections between the line cards 102 and the fabric cards 110 can shorten the signal path and improve the quality of signals exchanged between these components, the same is not true for the indirect electrical connections between different line cards 102. Instead, the fabric cards 110 lengthen and interrupt the signal path and can degrade the quality of signals exchanged between line cards 102. As a result, all network traffic that traverses the regular topology 100 must traverse through at least three hops from the line card layer 104 to the fabric card layer 112 and back to the line card layer 104.

Figure 2:
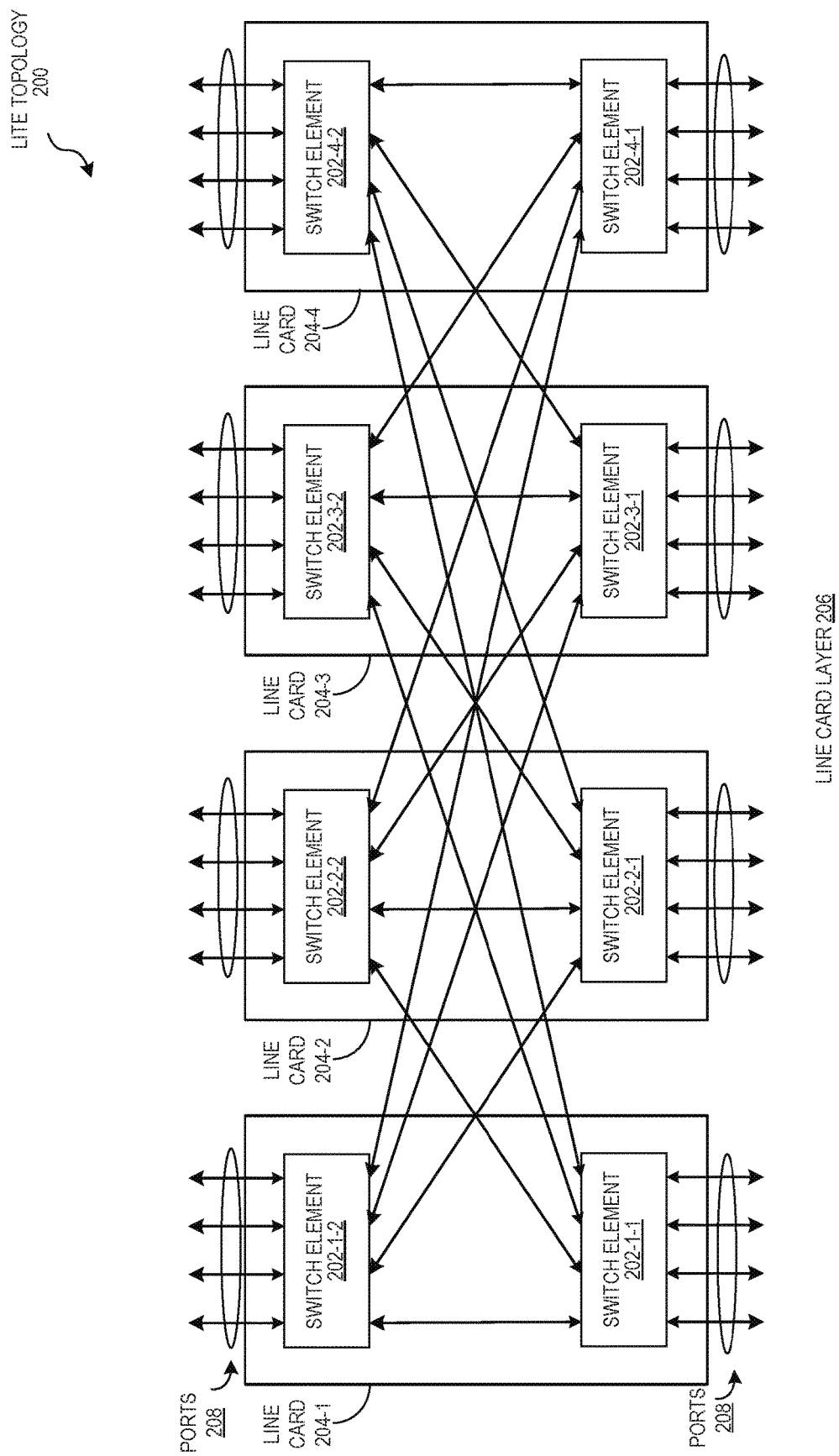
FIG. 2 is a block diagram illustrating a switch element topology of a lite network switch.

The disclosed embodiments have improved performance and efficiencies compared to regular network switches. For example, FIG. 2 is a block diagram illustrating a lite topology 200 of a network switch. This technology is referred to as a "lite" topology 200 because it has fewer switch elements compared to the regular topology 100. A network switch that implements the light topology 200 (a "lite network switch") has reduced costs and improved performance and efficiencies because it eliminates the need for intermediate fabric cards and, instead, connects the line cards in a cross-connect topology. For example, the illustrated lite topology 200 has 25% fewer switch elements, which would reduce the costs of a lite network switch by at least 25%. Moreover, a lite network switch would have at least 25% reduced power utilization, which greatly reduces the total power consumption of a datacenter with numerous network switches.

As indicated above with respect to FIG. 1, the regular topology 100 uses a generic configuration that can operate for any network usage. In contrast to being operable for generic network usage, the lite topology 200 is configured for a particular network usage. The lite network switch implementing the lite topology 200 can be pre-configured at installation time. For example, a particular network usage may include using a number of downlink ports to a rack switch, and using another number of uplink ports to an upper level switch. Knowing this configuration, the lite network switch can be configured for this particular network usage by assigning particular uplink and downlink ports accordingly. That is, an administrator can specify, configure, or assign certain ports as either uplink or downlink ports depending on the known particular network usage. Thus, a light network switch can support the same network connectivity as a regular network switch but can be comparably less expensive, faster, and consume less power because at least some traffic traverses fewer switch elements.

The lite topology 200 illustrated in FIG. 2 has a cross-connect configuration that can be implemented in a network switch. In some embodiments, the cross-connect arrangement and various embodiments of the technology described herein can be implemented in other types of computer systems, including other types of switch systems, server systems, etc. A lite network switch implementing the lite topology 200 can be enclosed by a cabinet constructed from, for example, sheet metal panels attached to a metal framework using techniques well known in the art.

A lite topology has fewer switch elements because it eliminates the need for any fabric cards, and the remaining switch elements are arranged in the cross-connect arrangement. As illustrated in FIG. 2, the lite topology 200 includes a total of eight switch elements 202-1-1 through 202-4-2 (also referred to collectively as switch elements 202 and individually as switch element 202). The illustrated lite topology 200 specifically includes four line cards 204-1 through 204-4 in a line card layer 206 that can form sixteen 100 gigabit links. Each line card 204 includes a pair of switch elements 202, and each switch element 202 has four ports 208 for receiving data from an external device and ASICs for forwarding received data. Thus, the lite topology 200 has a total of 32 ports 208 that can receive network traffic and send the network traffic to the other ports 208 or devices without needing to traverse a fabric card layer because the line cards 204 are in direct electrical communication with each other in the absence of intervening fabric cards (or circuit board connections).

In operation, lite network switches can function for similar network usage as regular network switches. For example, both types of topologies can have the same number of ports for external connections and can accommodate lower-level switches and higher-level switches. Hence, the overall switching functionality of the different topologies can be similar, except that the lite topology is faster, efficient, and is less costly.

The direct connection between line cards 204 can shorten the signal path and improve the quality of signals exchanged between these components. A particular port 208 of a switch element 202 that receives network traffic from a device other than the network switch is pre-configured as an uplink port of the lite network switch. A particular port 208 of a switch element that sends network traffic to a device other than the network switch is pre-configured as a downlink port of the lite network switch. In some embodiments, the ports 208 of a lite network switch can be pre-configured (or pre-assigned) as either uplink or downlink ports during installation to enable a desired network usage without needing fabric cards intervening between line cards. All traffic that traverses the lite topology 200 must traverse through at least two hops in a line card layer, rather than the minimum of three hops required to traverse a regular network switch.

Specifically, ports of a lite topology only need to communicate between lower and higher layer line cards. In contrast, a regular topology requires any port in the line card layer to communicate with switch elements of the fabric card layer before reaching another ports of a line card layer. Thus, all network traffic would have to go through the fabric card layer and back to a line card layer in the regular topology while the lite topology can avoid the fabric card layer altogether.

The network traffic takes the shortest route when traversing the lite network switch. As illustrated, the shortest path between switch elements in "north-south" paths are direct connections. That is, each switch element has one and only one direct connection to the other switch elements in "north-south" paths. In contrast, the shortest route between any switch elements in "east-west" paths must traverse at least one intervening switch element. Accordingly, network traffic traverses a minimum number of two hops in "north-south" paths and a minimum of three hops in "east-west" paths. In particular, traversing any two ports in a north-south path (e.g., from 202-1-1 to 202-1-2 or 202-2-2) only requires two hops and traversing any two ports in an east-west path (e.g., from 202-1 to 202-2-1 or 202-3-1) only requires three hops. Thus, the lite topology is advantageous because at least some network traffic only needs to traverse two hops and the remaining traffic only needs to traverse three hops, which is the minimum number of hops required for all network traffic that traverses regular network switches.

A lite topology has a "blocking" architecture in that network traffic may be blocked by other network traffic traversing the pre-configured lite network switch. The blocking configuration of the lite topology can result because all the ports cannot communicate in any way at any time without interfering with one another. This depends on a particular traffic pattern of a particular network usage and the particular pre-configuration of ports. In contrast, regular network switches have generic non-blocking configurations but require at least three hops in any "north-south" or "east-west" paths.

By eliminating fabric cards, traffic between switch elements of a lite network switch can traverse fewer hops, which improves performance over regular network switches. For example, at least some traffic that traverses the lite topology 200 need only traverse a two hops in a line card layer, not the minimum three hops of the regular topology 100. Further, the printed circuit boards (PCBs) of network switches that implement a lite topology are considerably less complex compared to network switches that implement a regular topology with more switch elements.

Thus, a lite topology is pre-configured to have a certain downlink and uplink cross-connect blocking architecture. For example, the lite topology 200 can be improved for RSW-FSW-SSW, top-of-rack switch to edge switch to core switch traffic. In particular, some of the ports of some switch elements can be pre-configured for downlink traffic and other ports of other switch elements can be pre-configured for uplink traffic. The lite topology 200 then operates passively to route traffic between the uplink and downlink ports. Thus, a network switch configured in accordance with the present technology need only have a different number and arrangement of switch elements with pre-configured ports compared to regular network switches to obtain the aforementioned benefits.

The disclosed embodiments include at least two schemes that can be used to manage traffic in a blocking topology. In a lossless scheme (also referred to as a "flow control scheme"), a lite network switch can send a signal to a sender device that a particular port is busy at the moment and indicates that the port should be tried for receiving network traffic at a later time. The network device can ask the sender device to buffer its network traffic until the blocked port is unblocked. On the other hand, in a lossy approach, packets that are received by a blocked port are simply dropped.

Figure 3:
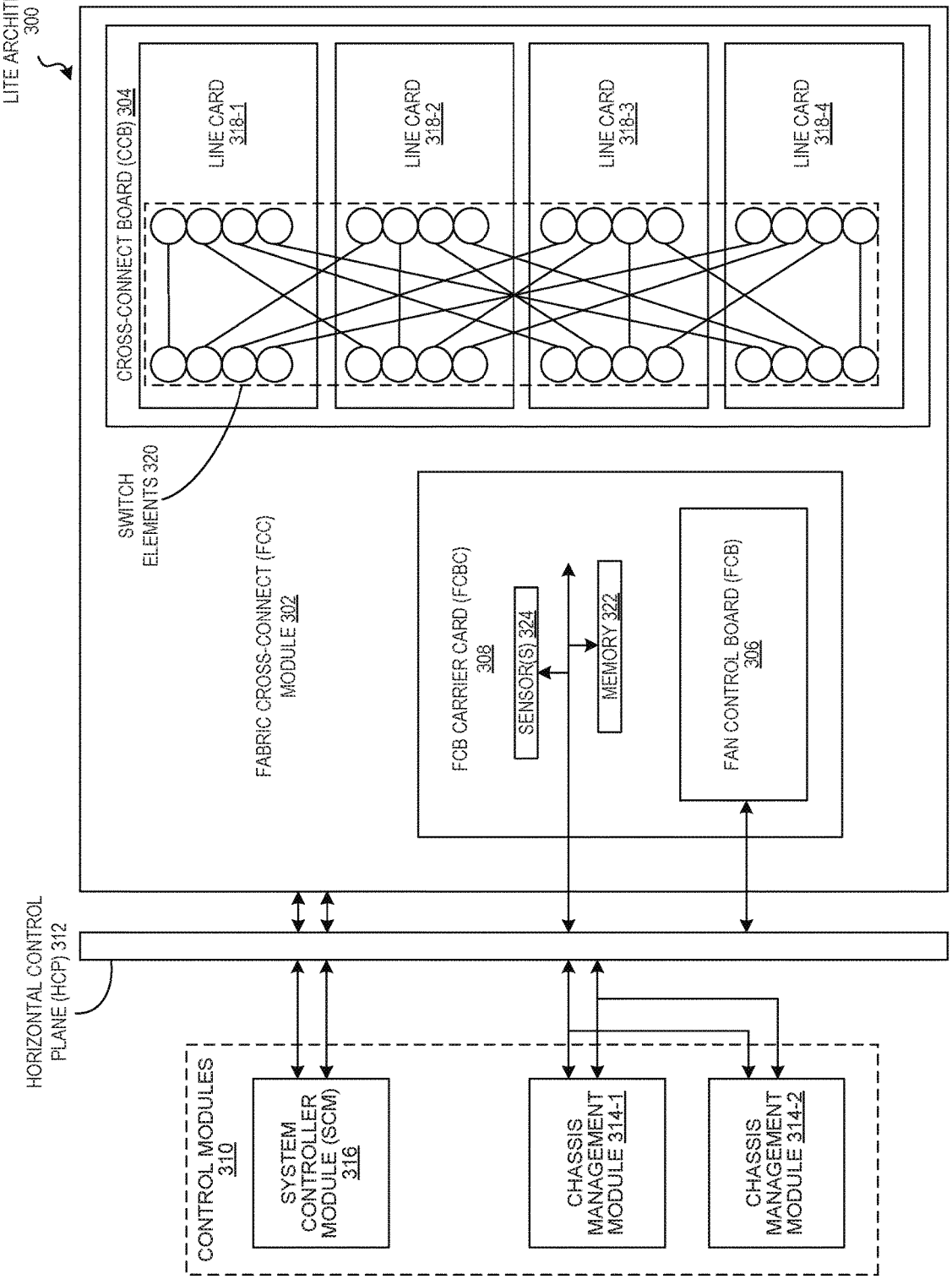
FIG. 3 is a block diagram illustrating a modular architecture of a lite network switch.

FIG. 3 is a block diagram illustrating a modular architecture 300 of a lite network switch ("light architecture 300). In particular, FIG. 3 illustrates a fabric cross-connect (FCC) module 302 that can be included in a conventional network switch to implement the disclosed lite architecture. The FCC module 302 has a modular architecture that includes three sub-modules: a cross-connect board (CCB) 304 a fan control board (FCB) 306 and the FCB carrier card (FCBC) 308. In some embodiments, each module or sub-module is included in a separate PCB or a combination of PCBs. In some embodiments, conventional PCB materials are used for the modules to reduce costs. Further, modules can include conventional components. For example, the CCB 304 and FCBC 308 can be implemented in separate PCBs, and the FCB 306 can be a conventional component typically used in regular network switches.

The FCC module 302 is connected to control modules 310 via a horizontal control plane (HCP) 312. The HCP 312 could be operably connected to right and left vertical control planes (note shown). The VCPs and the HCP 312 form a control plane of the lite network switch for interconnecting the various computer modules. The HCP 312 may include a number of connectors for connecting control modules and the FCC module 302. For example, each of two chassis management modules (CMMs) 314-1 and 314-2 have one or more CPUs for chassis management. A system controller module (SCM) 316 includes one or more CPUs for controlling operations of switch elements on the line cards 318. The FCC module 302 can also be connected a number of power units (not shown) that can convert AC power to low-voltage, regulated DC power for use by the network switch components. The FCC module 302 can include fewer, more, or other components known to persons skilled art but omitted herein for brevity.

The FCC module 302 can include one or two physical studs to support the CCB 304 mounted thereon. The FCC module 302 is used to cross-connect switch elements 320 of the CCB 304 In particular, the CCB 304 is implemented in a PCB with a passive cross-connect lite topology that provides higher speed data traffic compared to regular topologies. As shown, the CCB 304 cross-connects switch elements 320 of four line cards 318-1 through 318-4. In some embodiments, each line card 318 can use a TOMAHAWK chip (e.g., a switch ASIC) for downlink ports and another TOMAHAWK chip for uplink ports. The failure of any line card 318 will only cause about a 25% traffic loss.

Figure 4:
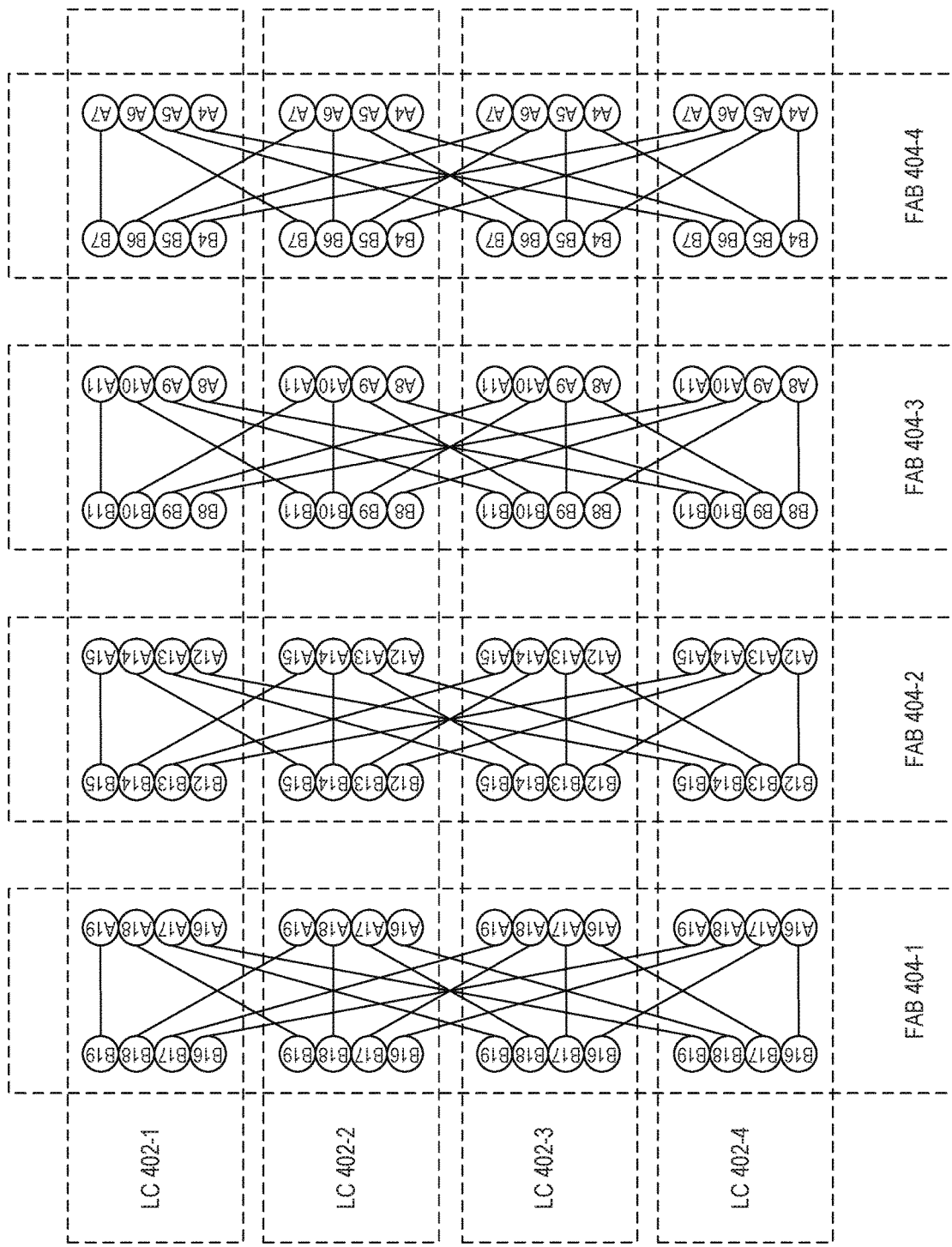
FIG. 4 is a block diagram illustrating a cross-connect architecture of a lite network switch.

The lite network switch has a 25% power savings compared to the regular architectures because the FCC module does not need a switch chip (ASIC), its control plane CPU or microprocessor, or its base board management controller. FIG. 4 is a block diagram illustrating interconnected switch elements of a CCB. As shown, the line cards 402-1 through 402-4 are oriented perpendicular to the FABs 404-1 through 404-4. In some embodiments, each line card 402 has 4×100 G ports to switch element A (202-1-1, 202-2-1, 202-3-1, 202-4-1 of FIG. 2) and 4×100 G to switch element B (202-1-2, 202-2-2, 202-3-2, 202-4-2 in FIG. 2) connectors. The CCB may support 1E−15 bit error rate (BER) without enabling Reed Solomon forward error correction (RS-FEC). The illustration shows the port connections for the FCC module, which interconnects pre-assigned uplink ports and pre-assigned downlink ports. Thus, the ports are interconnected directly without intervening fabric cards.

In some embodiments, a lite network switch can include forced convection units (e.g. fan units) used to cool the lite network switch. A fan unit can include an electric motor that drives the fan. Referring back to FIG. 3, A number of fan units can be arranged in groups of fan trays, which are connected to a the FCBC 308. In operation, the fan units draw air into the network switch via air inlets, moves through the network switch, and exits via outlets. The FCBC 308 may include one or two physical studs to support the FCB 306. As such, the FCB 306 may be mounted on the FCBC 308, which could include one or two studs to support the FCB 306. The FCB 306 can support a number of hot swap fan trays.

The lite network switch may include a complex programmable logic device (CPLD) (not shown) that can control a fan speed, and a CMM that can control a number of fans via an inter-integrated circuit (I2C) bus. Specifically, the FCBC 308 can provide power and communicate control signals from a CMM to the FCB 306. The FCBC 308 can include other components known to person skilled in the art but omitted herein for brevity. For example, the FCBC 308 may include a non-volatile memory unit 322 (e.g., EEPROM) that stores board information, and a temperature sensor 324 used to control a fan based on a monitored temperature. The components described above with reference to FIGS. 3 and 4 are illustrative of some components included in a lite network switch.

Figures 5A, 5B:
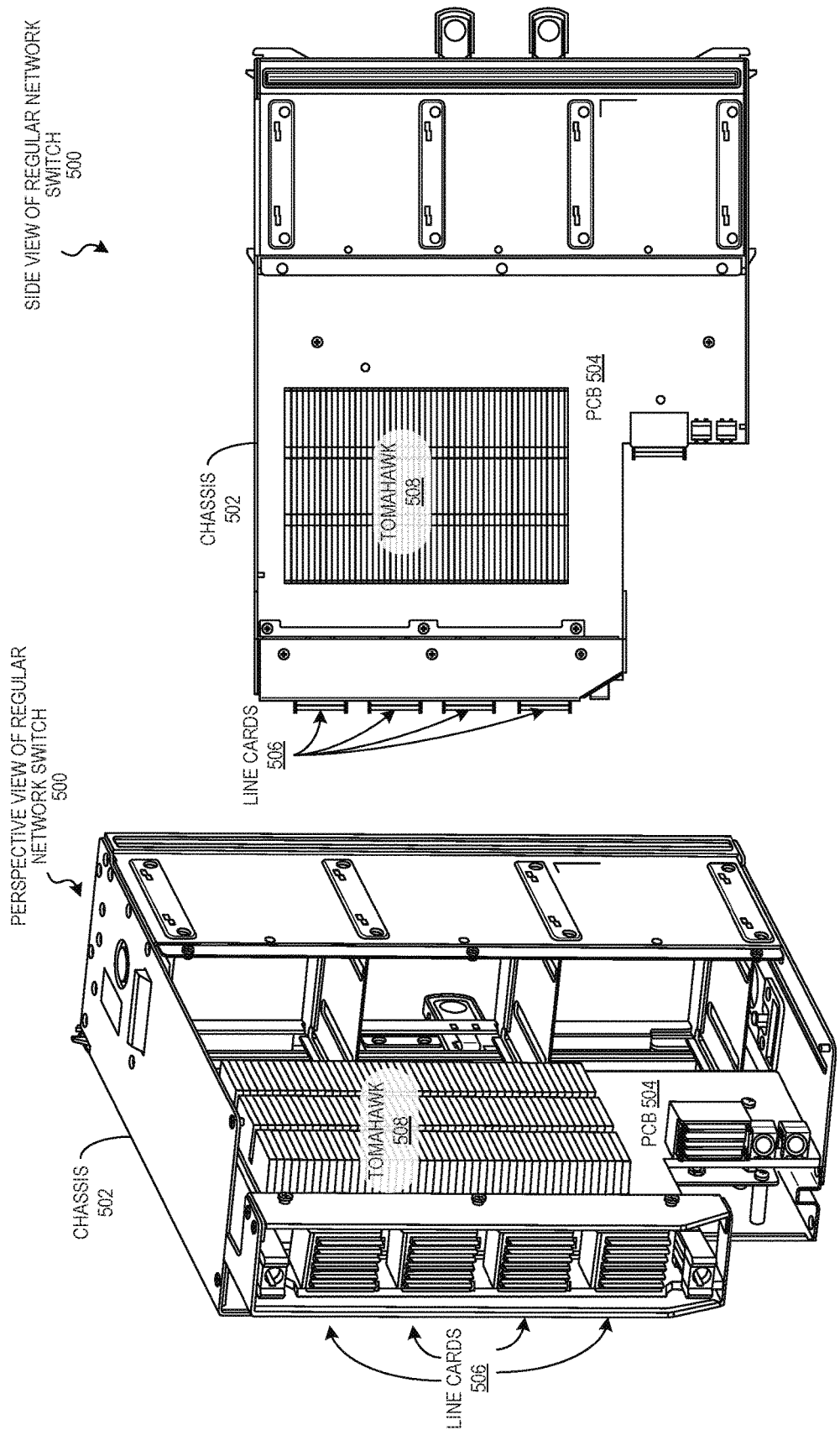
FIG. 5A illustrates a perspective view of a regular network switch with its enclosure partially removed.
FIG. 5B illustrates a side view of the regular network switch of FIG. 5A.

FIGS. 5A and 5B illustrate a perspective view and side view, respectively of a regular network switch with its enclosure partially removed for purposes of aiding in understanding. The regular network switch 500 has a chassis 502 that supports a number of components include a single PCB 504. In particular, four line cards 506 are arranged in parallel and mounted on the PCB 504 (e.g., CCB 304). The four line cards 506 are disposed in the front of the chassis 502 and four fabric cards (not shown) are disposed near the rear of the chassis 502 The line cards 506 include electronic circuitry (e.g., ASICs) mounted on the PCB 504 A number of control modules (not shown) are disposed beneath the line cards 506. Each control module includes a CPU mounted to the PCB 504.

The regular network switch 500 includes a TOMAHAWK chip 508 mounted on the PCB 504 to interconnect the line cards 506 and fabric cards. Each fabric card includes a circuit board that includes electronic circuitry (e.g., ASICs) that functions to route data through the network switch from a line card layer to fabric card layer and back to a link card layer. In some embodiments, a portion of each fabric card includes an FCB for providing electrical power and control signals to fan tray.

The regular network switch includes a left VCP oriented vertically proximate the left side wall of the cabinet and a right VCP is similarly positioned proximate the right side wall of the cabinet. The HCP is connected to the bottom of each of the VCPs, and extends horizontally across a lower-mid portion of the cabinet. The line card connectors are offset to opposite sides of the cabinet and the control module connectors are positioned below the line card connectors.

Figures 6A, 6B:
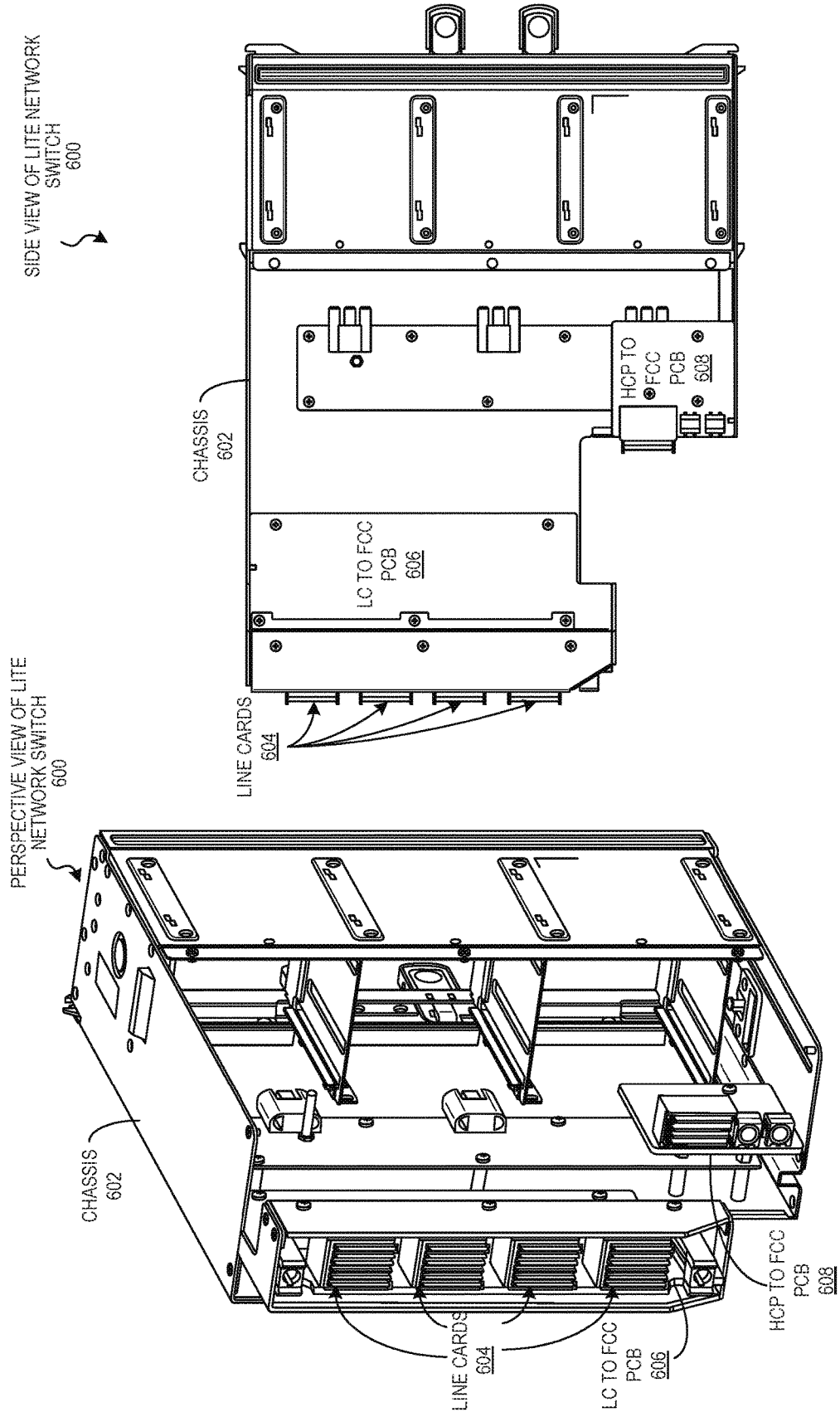
FIG. 6A illustrates a perspective view of a lite network switch with its enclosure partially removed.
FIG. 6B illustrates a side view of the lite network switch of FIG. 6B.

By comparison, FIGS. 6A and 6B illustrate a perspective view and side view, respectively, of a lite network switch 600 with its enclosure partially removed for purposes of aiding In understanding. The modules and sub-modules of the lite network switch 600 fit into the same chassis of a regular network switch 600 because the light architecture has fewer of many of the same components. As shown, the lite network switch 600 includes a chassis 602 with four line cards 604 that arranged in parallel and are mounted on a first PCB 606 disposed in the front of the chassis 602.

Unlike the regular network switch 500, the lite network switch 600 eliminates the need for fabric cards and, as such, eliminates the need for a TOMAHAWK chip 508 mounted on the single PCB 504 as shown in FIGS. 5A and 5B. Instead, the light network switch 600 has the FCC module pass-through card that includes two small pass-through cards: a PCB for connecting line cards to the FCC 606 and a PCB for connecting an HCP to the FCC 608. All the circuitry interconnecting the switch elements is on the two smaller PCBs 606 and 608 rather than a single PCB.

Figure 8:
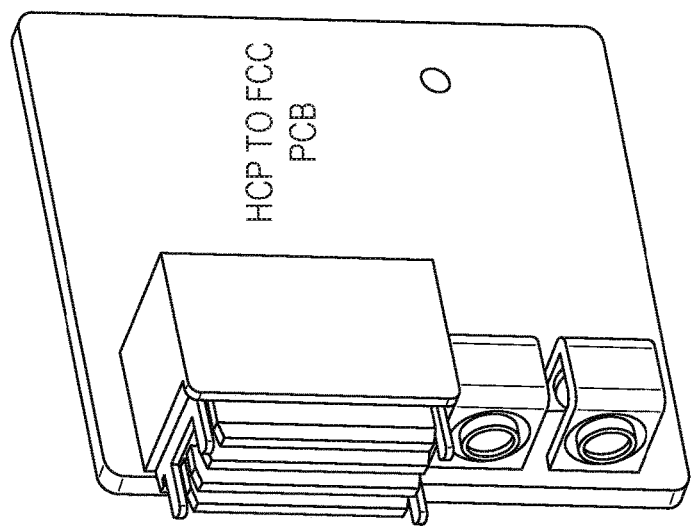
FIG. 8 illustrates a perspective view of a printed circuit board for connecting a horizontal control plane to a fabric cross-connect module of a light network switch.
Figure 7:
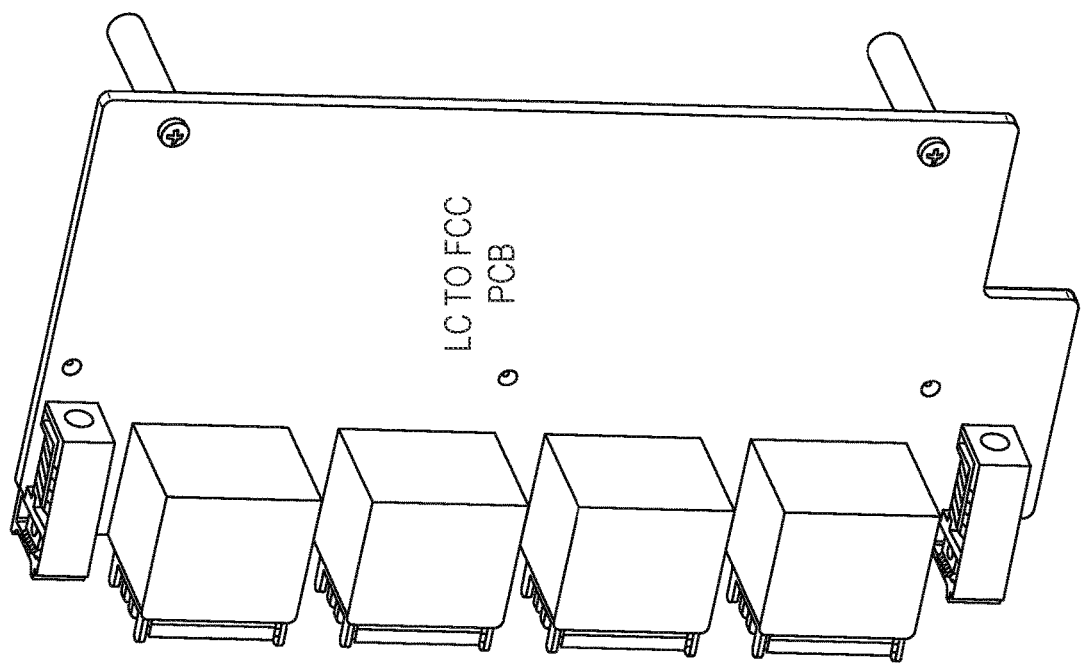
FIG. 7 illustrates a perspective view of a printed circuit board for connecting line cards to a fabric cross-connect module of a light network switch.

For example, FIGS. 7 and 8 illustrate examples of two smaller PCBs of a lite network switch. In particular, FIG. 7 illustrates a PCB configured to connect line cards to an FCC module, and FIG. 8 illustrates a separate PCB configured to connect an HCP to the FCC module. The combination of PCBs shown in FIGS. 7 and 8 enable a cross-connect topology that interconnects line cards of a lite network switch.

Although specific circuitry may be described above, those of ordinary skill in the art will recognize that aspects of the present technology are not limited to the particular arrangements illustrated herein, but can be implemented in various other modular arrangements of switch circuitry. Moreover, the technology described above could be described in terms of operations performed by a lite network switch, which has improved performance and reduced costs compared to regular network switches.

Figure 9:
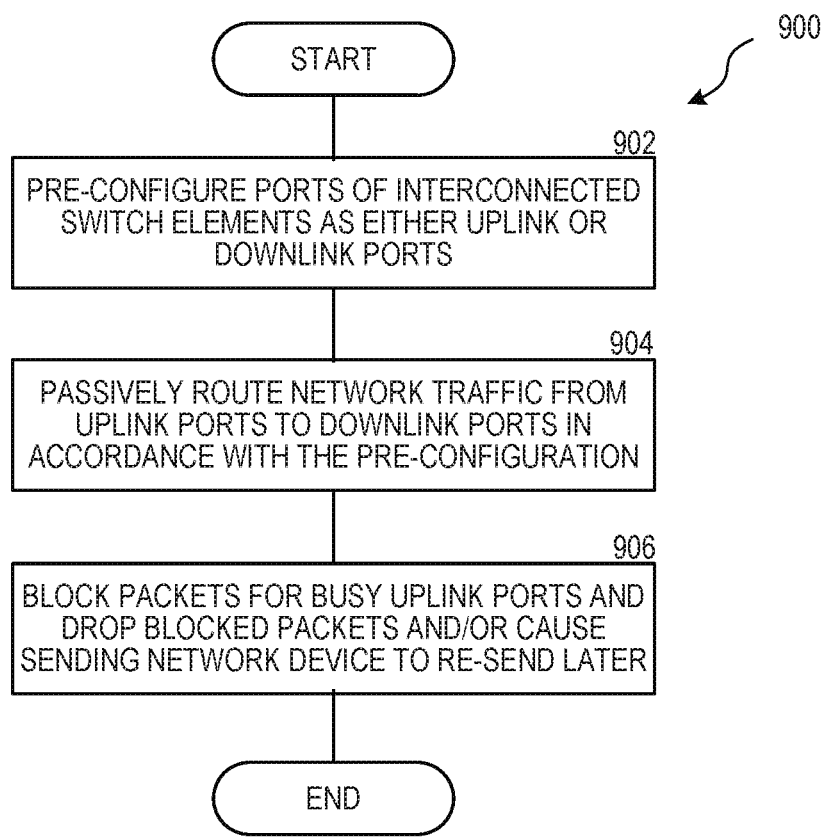
FIG. 9 is a flow diagram illustrating a method for passively routing network traffic in a cross-connect architecture of a lite network device.

For example, FIG. 9 is a flow diagram illustrating a method for passively routing network traffic in the cross-connect architecture of a lite network device. The process 900 is performed by a lite network switch coupled to devices over a network.

In step 902, the ports of interconnected switch elements of line cards are pre-configured as either uplink ports or downlink ports. The ports are pre-configured as such depending on the particular usage of the network using the lite network switch. In other words, a lite network switch is configured based on the particular network usage. By pre-configuring the ports, the lite network switch can passively route network traffic in accordance with the particular network usage. In some instances, the ports are pre-configured when the lite network switch is installed.

In step 904, the uplink ports receive network traffic sent by other devices over the network. In step 906, the received network traffic is passively routed in accordance with the pre-configured cross-connected switch elements from uplink ports to downlink ports across the lite network switch. As described above, the lite topology allows for more efficient routing by using fewer switch elements compared to the regular topology, which are interconnected in a manner that improves performance of the network switch by consuming less power and reducing costs compared to the regular topology.

In step 906, the pre-configured lite network switch has a blocking configuration such that ports being used to routing network traffic block other network traffic from being routed. The lite network switch can implement different schemes to compensate for the blocking. For example, in a lossy scheme, any traffic received by a busy port is simply dropped. In a lossless scheme, the network switch can cause a sending device to send network traffic that avoids blocking by using ports that are not busy. For example, the lite network switch may request sending devices to not send network traffic to the lite network switch at certain times or re-send network traffic that has been blocked by busy ports. As such, the sending devices can buffer the network traffic until the ports are no longer busy.

Figure 10:
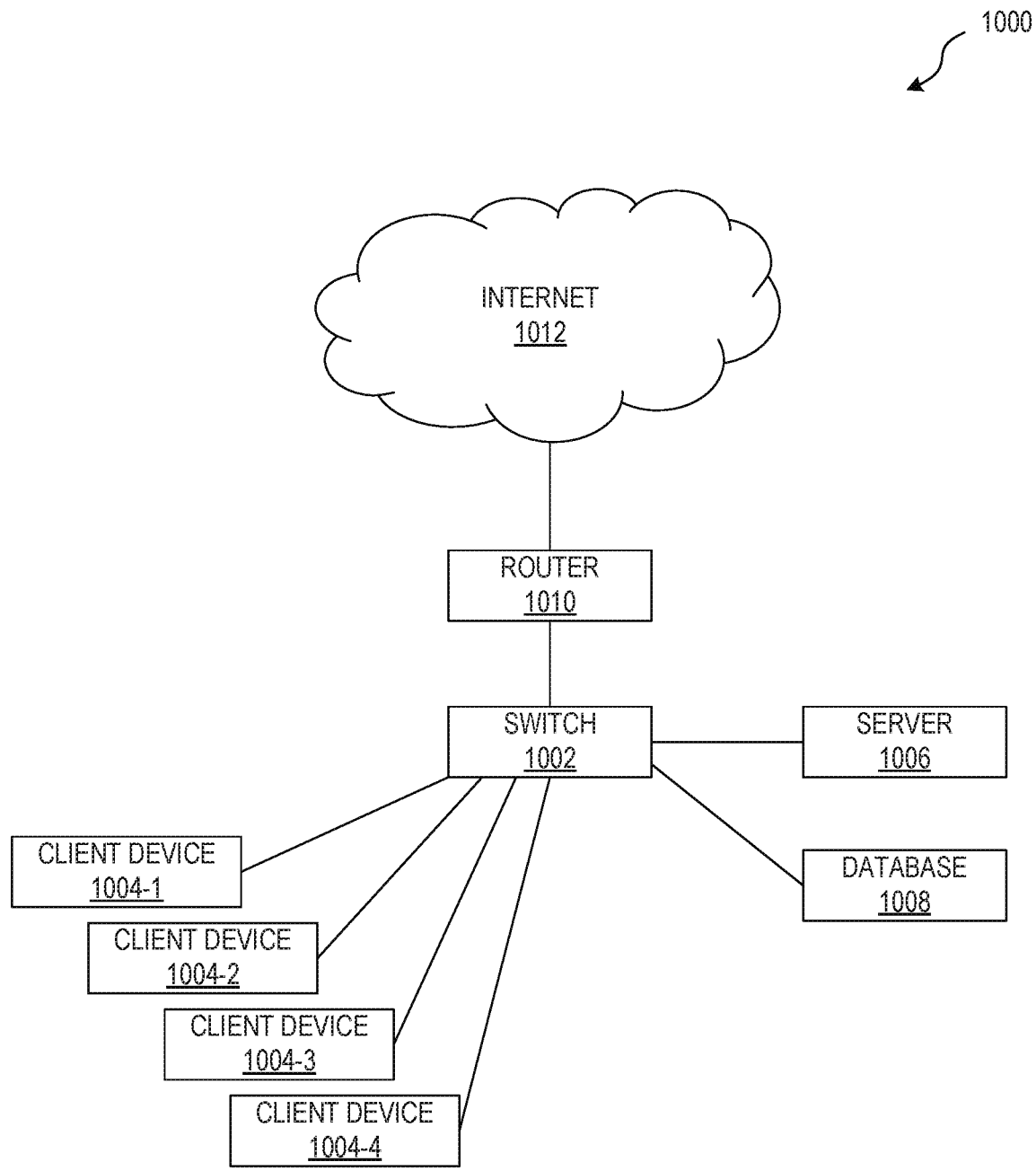
FIG. 10 is a block diagram illustrating a computing environment in which a lite network switch can be implemented.

FIG. 10 in the following discussion provides a brief, general description of a suitable computing environment 1000 in which a network switch 1002 ("switch 1002") can be implemented. In the illustrated embodiment, the switch 1002 can be implemented in a networked environment using logical connections to one or more remote computers, such as multiple client devices 1004 (identified individually as client devices 1004-1 through 1004-4) or any computing devices. The client devices 1004 can include, for example, personal computers or work stations, etc. having one or more associated processors coupled to one or more user input devices, data storage devices, etc. The switch 1002 can also be operably connected to one or more servers 1006 and/or an associated databases 1008. In operation, the switch 1002 can receive data from one or more of the client devices 1004 and efficiently route or transmit the data to one or more different devices in the environment 1000, or to an additional remote device via a router 1010 and the Internet 1012. Aspects of the disclosed technology, however, are not limited to any particular environment, and may be practiced in a variety of other computing environments.

Those skilled in the relevant art will appreciate that aspects of the technology disclosed herein can be practiced with other communications, data processing, or computer system configurations, including: Internet appliances, handheld devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system, comprising:
a first plurality of switch elements of a network switch, wherein each switch element of the first plurality of switch elements includes a different application-specific integrated circuit (ASIC);
a second plurality of switch elements cross-connected to the first plurality of switch elements and configured to route network traffic through the network switch in accordance with a predefined configuration, wherein each switch element of the second plurality of switch elements includes a different application-specific integrated circuit (ASIC);
a fabric connect module including a cross-connect module including a plurality of line cards, wherein each line card of the plurality of line cards includes the corresponding different application-specific integrated circuit of one corresponding switch element from the first plurality of switch elements and the corresponding different application-specific integrated circuit of one corresponding switch element from the second plurality of switch elements, and wherein there exists at maximum one corresponding direct communication connection between each of the first plurality of switch elements and each of the second plurality of switch elements; and
a fan control module configured to operate a forced convection unit.

2. The system of claim 1, wherein there exists a corresponding electrical connection between each of the first plurality of switch elements and each of the second plurality of switch elements.

3. The system of claim 1, wherein each of the first plurality of switch elements of the network switch includes a plurality of ports and each of the second plurality of switch elements of the network switch includes a plurality of ports.

4. The system of claim 1, wherein network traffic traversing any two switch elements of the first plurality of switch elements or the second plurality of switch elements requires traversing only three switch elements.

5. The system of claim 1, wherein network traffic traversing any two switch elements of the first plurality of switch elements and the second plurality of switch elements requires traversing only two switch elements.

6. The system of claim 1, wherein each switch element includes at least one port and each port is a pre-configured uplink port or a downlink port.

7. The system of claim 6, wherein the network switch is pre-configured such that network traffic traverses passively from a pre-configured uplink port to a pre-configured downlink port.

8. The system of claim 1, wherein each switch element includes at least one port and each port is pre-configured as an uplink port or a downlink port for a particular network usage upon installation of the network switch.

9. The system of claim 1, wherein each switch element includes a port and each port of each switch element is pre-configured as an uplink port or a downlink port such that all network traffic traverses passively from a pre-configured uplink port to a pre-configured downlink port.

10. The system of claim 1, wherein each switch element includes a port configured to passively route only some network traffic such that at least some of the network traffic is blocked.

11. The system of claim 1, wherein each switch element includes a port configured to drop packets intended to traverse the network switch.

12. The system of claim 1, wherein a switch element includes an uplink port configured to receive network traffic as indicated by the network switch to a device sending the network traffic.

13. The system of claim 1, wherein the network switch is configured to passively route network traffic in accordance with a particular usage of a network using the network switch.

14. The system of claim 1, further comprising a fan control carrier module configured to support the fan control module by providing power and control signals to power and control the operation of the forced convection unit.

15. The system of claim 1, further comprising:
a first printed circuit board (PCB) including the cross-connect module; and
a second PCB separate and distinct from the first PCB, the second PCB including a connector to couple the fabric connect module to a horizontal control plane module.

16. The system of claim 1, further comprising:
a control module including a central processing unit for controlling operations of each switch element; and
a horizontal control plane module configured to electrically connect the control module to the fabric connect module via connectors of the horizontal plane control module.

17. The system of claim 1, further comprising a chassis management module configured to control a fan via a system inter-integrated circuit bus.

18. The system of claim 1, further comprising a complex programmable logic device configured to control behavior of the forced convection unit.

19. A system, comprising:
a first group of switch elements and a second group of switch elements, including:
a pre-configured plurality of uplink ports, and
a pre-configured plurality of downlink ports cross-connected to the uplink ports,
wherein the system is configured to transport network traffic from one or more of the uplink ports to one or more of the downlink ports in accordance with pre-configured routes, wherein each switch element of the first group of switch elements includes a different application-specific integrated circuit (ASIC), and wherein each switch element of the second group of switch elements includes a different application-specific integrated circuit (ASIC);
a fabric connect module including a cross-connect module including a plurality of line cards, wherein each line card of the plurality of line cards includes the corresponding different application-specific integrated circuit of one corresponding switch element from the first group of switch elements and the corresponding different application-specific integrated circuit of one corresponding switch element from the second group of switch elements, and wherein there exists at maximum one corresponding direct communication connection between each of the first group of switch elements and each of the second group of switch elements; and a fan control module configured to operate a forced convection unit.

20. A method, comprising:

receiving network traffic by a plurality of uplink ports of at least a portion of a plurality of switch elements of a plurality of line cards; and routing the received network traffic to a plurality of downlink ports of at least a portion of the plurality of switch elements of a network switch;

wherein each switch element of a first group of switch elements included in the plurality of switch elements includes a different application-specific integrated circuit (ASIC), each switch element of a second group of switch elements included in the plurality of switch elements includes a different application-specific integrated circuit (ASIC), and the network switch includes a fabric connect module including a cross-connect module including the plurality of line cards, and each line card of the plurality of line cards includes the corresponding different application-specific integrated circuit (ASIC) of one corresponding switch element from the first group included in the plurality of switch elements and the corresponding different application-specific integrated circuit (ASIC) of one corresponding switch element from the second group included in the plurality of switch elements;

wherein there exists at maximum one corresponding direct communication connection between each of the first group of switch elements and each of the second group of switch elements; and wherein the network switch includes a fan control module operating a forced convection unit.

* * * * *